3,548,299
METHOD AND APPARATUS UTILIZING A PAIR
OF MAGNETIC FIELD DETECTORS AND AN
ELECTRIC FIELD DETECTOR FOR DETERMIN-
ING THE ELECTRIC RESISTANCE OF THE SUB-
SOIL BY MEANS OF ELECTROMAGNETIC
WAVES
Jean Duroux and Pierre R. Griveau, Paris, and Michel
Zahaczewski, Chatenay-Malabry, France, assignors to
Bureau de Recherches Geologiques et Minieres, Paris,
France
Filed May 28, 1968, Ser. No. 732,711
Claims priority, application France, June 6, 1967,
109,207; Oct. 9, 1967, 123,711; Feb. 6, 1968,
138,421
Int. Cl. G01v 3/12
U.S. Cl. 324—6
11 Claims

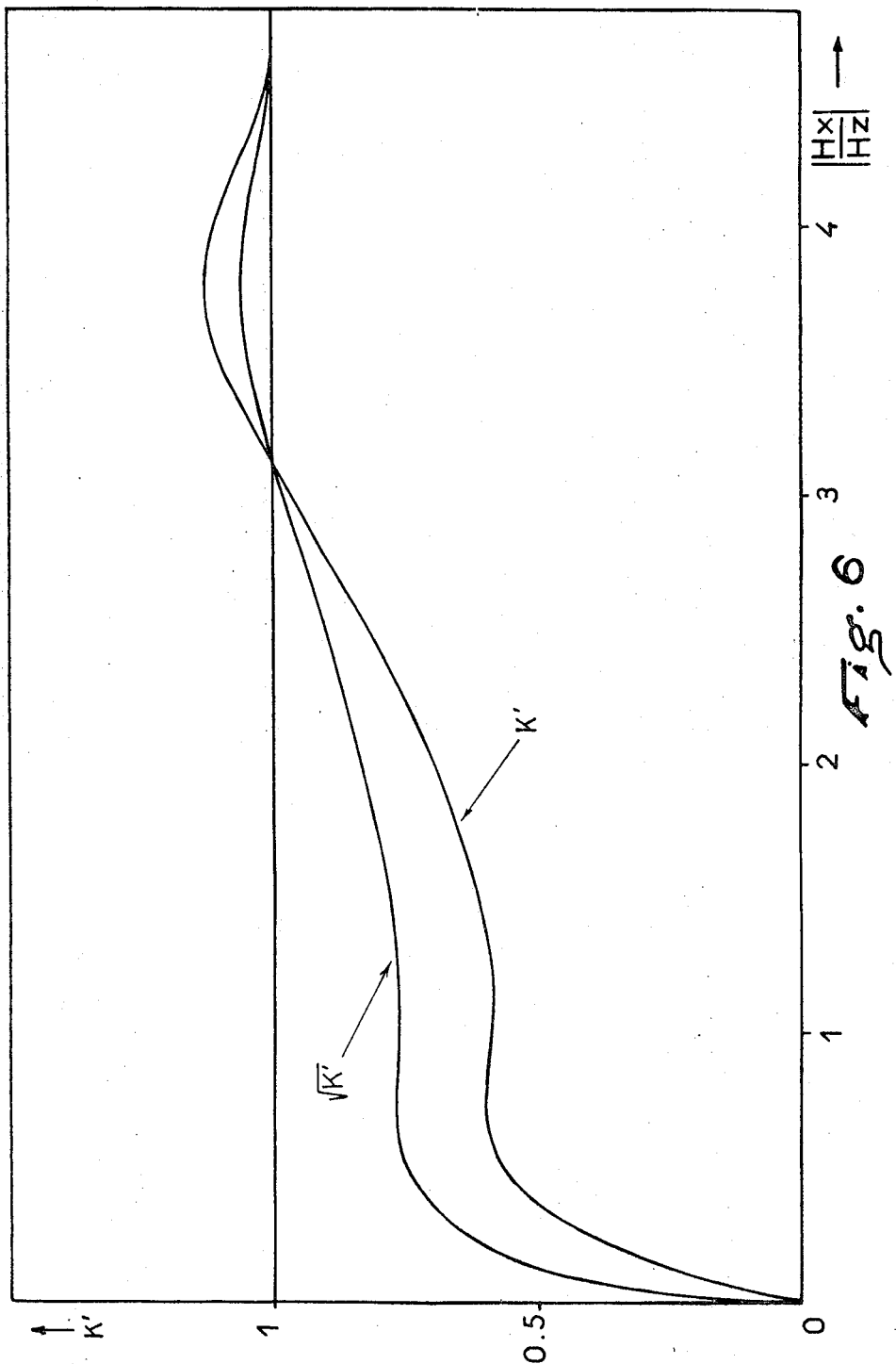

ABSTRACT OF THE DISCLOSURE

A method for determining the electrical resistance of the earth by establishing an electromagnetic field, measuring the radial component $Hx$ and the vertical component $Hz$ of the magnetic field and the transverse component $Ey$ of the electric field, and then determining the resistance from mathematical formulas. Different formulas may be employed depending upon the field propagation characteristics of the earth and the distance between the field source and the field measuring equipment.

Figure 1:
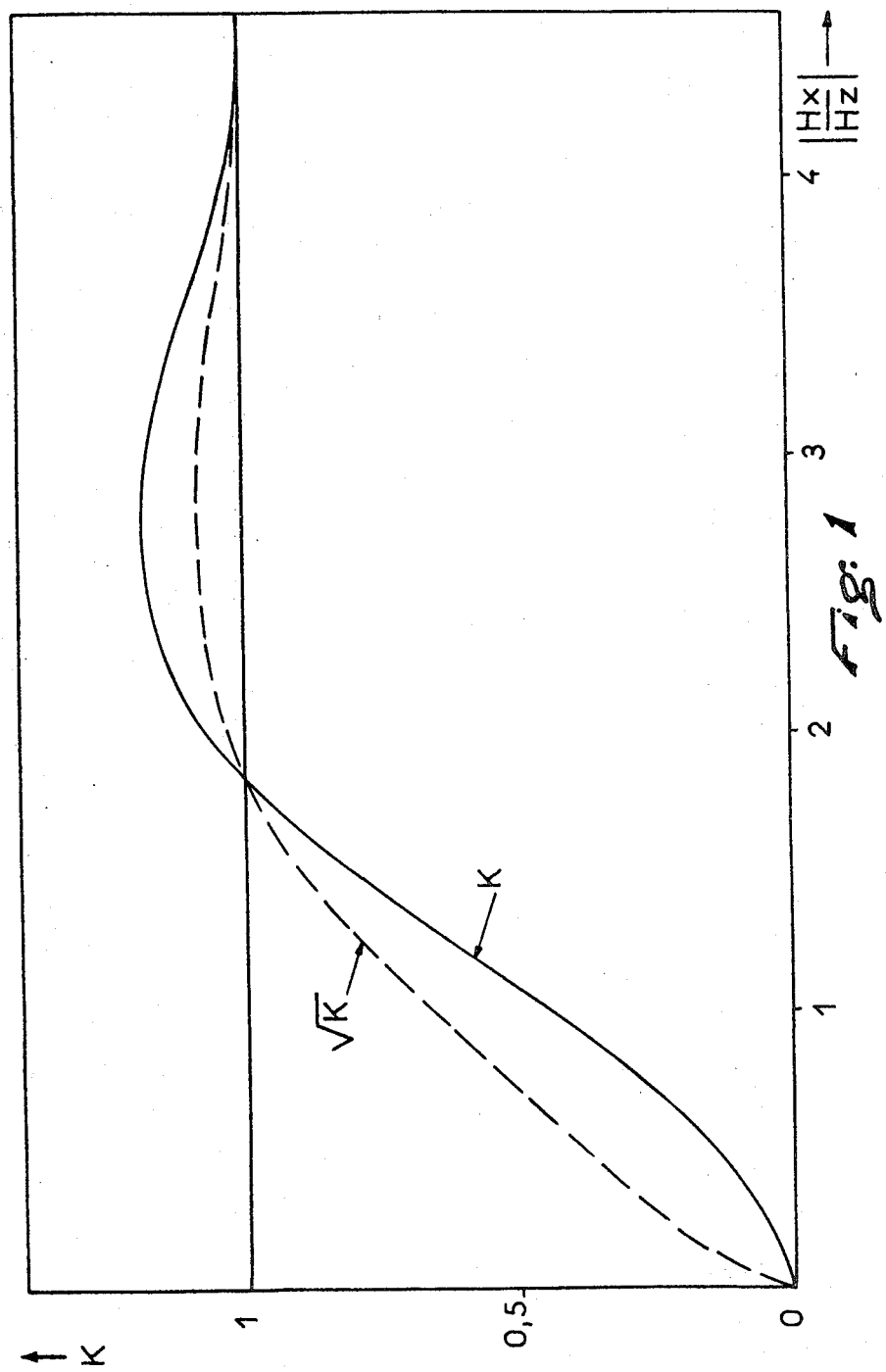

This invention relates to a new method for measuring the conductivity of earth in depth, and involves the phenomena of electromagnetic wave propagation engendered by a magnetic dipole with a vertical axis.

We know that there are numerous methods for determining the nature of the subsoil. We might, for example, measure electric currents sent into the soil, but we must then increase the length of the waves used to practically unacceptable values the moment we want to find out the nature of the earth at very great depths.

It has also been thought that the use of the electromagnetic phenomena engendered by an appropriate source might be of help here but regardless of the methods used, the results obtained are essentially qualitative due to the highly empirical state of the interpretations of the measurements.

Finally, it has been thought that one might use natural electromagnetic emissions. However, because of their uncontrollable and transitory characteristics, it is impossible to get quantitative results, except as a result of long and difficult treatment, by virtue of the nature of the signals received. These methods thus are highly limited as far as in their usefulness is concerned.

The main object of this invention consists in a method for the determination of the resistance of the earth at great depths, by means of electromagnetic radiation, characterized by the fact that a transmitter with adjustable frequency, consisting of a magnetic dipole with a vertical axis, gives rise, along a line vertical to the place where we want to measure the resistance of the terrain, to an electromagnetic field received by a receiver consisting of two magnetic detectors for the measurement of the radial component $Hx$ and the vertical component $Hz$ of the magnetic field and an electrical detector for the measurement of the transverse component $Ey$. The resistance is then obtained with the help of the following approximate expressions:

$$Ey = \frac{6}{\gamma^2 r^2} Eo \quad Hx = \frac{6}{\gamma r} Ho \quad Hz = \frac{18}{\gamma^2 r^2} Ho$$

Here $Eo$ and $Ho$ are the standard values of the electrical and magnetic fields produced by the dipole in the vacuum, having the following value, respective:

$$Eo = \frac{NSI}{4\pi r^2} jw\mu_0 \quad Ho = \frac{NSI}{4\pi r^3}$$

where $N$ is the number of turns, $S$ is the unit surface, $I$ is the intensity of the current in the coil, $r$ is the distance to the electromagnetic source, and $\gamma$ is the complex propagation constant $\sqrt{j\mu_0 w\sigma}$ where $\mu_0$ is the magnetic permeability of the vacuum, $w$ is the angular frequency and $\sigma$ is the conductivity of the subsoil, which is assumed to be uniform in this first phase of our description.

Calculation and experience have shown that the application of these formulas gives us an excellent approximation when the value of $|\gamma r|$ is greater than 12. Thus we find that the wave level containing $$\overrightarrow{EY} \text{ and } (\overrightarrow{Hx} + \overrightarrow{Hz})$$

progressively approaches the horizontal level as $r$ grows, and it comes very close when the values of $|\gamma r|$ are very great. Approximately and in a given place we then get a level, horizontal, evanescent quasi-wave which penetrates into the subsoil.

If we now consider the general case of any kind of tabular distribution of the conductivities as a function of the depth, we get, according to the invention, to the case where we deal with a homogeneous subsoil. Here we consider, for each frequency, the apparent equivalent conductivity and we can get through anything that might exist in the subsoil between the transmitter and the receiver. On the basis of the measurement of the components $Ey$ and $Hx$ at the place considered, we then calculate the values of the surface impedance $Ey/Hx$ taken then for a series of frequencies of a given band. These values are in a ratio to the complete distribution of the conductivities of the various types of terrain involved and they enable us thus to gain access to the distribution of the conductivities of the earth types as a function of the depth at the vertical of a trace situated at distance $r$ from the source, by application of the formula giving us the apparent resistance $\rho$ for each frequency:

$$\rho = \frac{1}{\sigma} = \frac{1}{w\mu_0}\left(\frac{Ey}{Hx}\right)^2$$

On the other hand, in the case of geometric distributions of resistances in the subsoil, other than horizontal stratification, we take into account the lateral variations in the resistance while still using the same method.

In the more general case of prospecting, when we operate in conditions where the values are $|\gamma r|$ become less than 12, the approximate expression of $Ey/Hx$ is no longer valid. We must then use a correction factor $K$ which we introduce into the preceding expression of the apparent resistance:

$$\rho = \frac{K}{w\mu_0}\left(\frac{Ey}{Hx}\right)^2$$

The correction factor $K$ is a function of the ratio $|Hx/Hz|$ rigorous, likewise a one-to-one function of $|\gamma r|$ and accessible directly by measurement. It is defined by the relationship:

$$K = \left(\frac{Ey}{Hx}\right) \text{approx.} \cdot \left(\frac{Hx}{Ey}\right)^2 \text{rigorous}$$

Another object of the invention thus concerns the kind of method in which the resistance of the ground is given, in the case where the values of $|\gamma r|$ are smaller than 12, by the application of the formula giving the apparent resistance in which we have included the coefficient $K$.

Thus the application of this method enables us, even when the values of $|\gamma r|$ are small, to measure the resistance of the subsoil, benefitting from the great advantage of being able to work at relatively small distances from the transmitting dipole, without having, because of this fact, to make a very considerable increase in the immission power of that dipole. To determine the conductivity of the ground in a given place, regardless of the values of $|\gamma r|$, we must therefore have an electric detector and two magnetic detectors.

Another object of this invention thus consists in a prospecting apparatus which can be used in implementing the method described here, involving an emitter consisting of an adjustable-frequency current generator connected to an insulated emission loop which rests on the ground. The loop is selected from a series of loops having the same resistance but different diameters. The emitter is combined with a suitable receiver equipped with two magnetic detectors in order to measure the components $Hx$ and $Hz$ of the magnetic field, and an electric detector for the measurement of the component $Ey$ of the electric field. These detectors are connected to a variable gain amplifier by simple commutation. This amplifier is connected to a pre-regulated frequency filter commutable to the frequency selected, and this commutable filter is connected to a measurement instrument.

In this way we get a simple device capable of transmitting and receiving any frequency of the spectrum of extremely low frequencies. It is not necessary here to get perfect agreement between the transmitter and the receiver. The apparatus thus constitutes a portable, low-cost, light-weight unit featuring remarkable simplicity, compared to the power emitted.

Another object of the invention consists in a variation of the method where the apparent resistance $\rho$ is given for each frequency when the value of $|\gamma r|$ is greater than a value on the order of 12, by means of the measurement of the ratio of the components of the magnetic field $Hx/Hz$ and the application of the formula $$\rho = \frac{r^2 w \mu_o}{9\left(\frac{Hx}{Hz}\right)^2}$$

where $w$ is the angular frequency and $\mu_o$ is the magnetic permeability of the vacuum. The apparent resistance for values of $|\gamma r|$ smaller than 12 is obtained by applying the formula $$\rho = \frac{'r^2 w u_o}{9\left(\frac{Hx}{Hz}\right)^2}$$

where $K'$ is given by the relationship $$K = \left(\frac{Hx}{Hz}\right)^2 \text{ rigorous } \cdot \left(\frac{Hz}{Hx}\right)^2 \text{ approx.}$$

We can thus avoid the use of a couple of electrodes necessary for the measurement of the electric field and we can use magnetic detectors whose calibration in terms of absolute value is no longer necesary.

Figure 2:
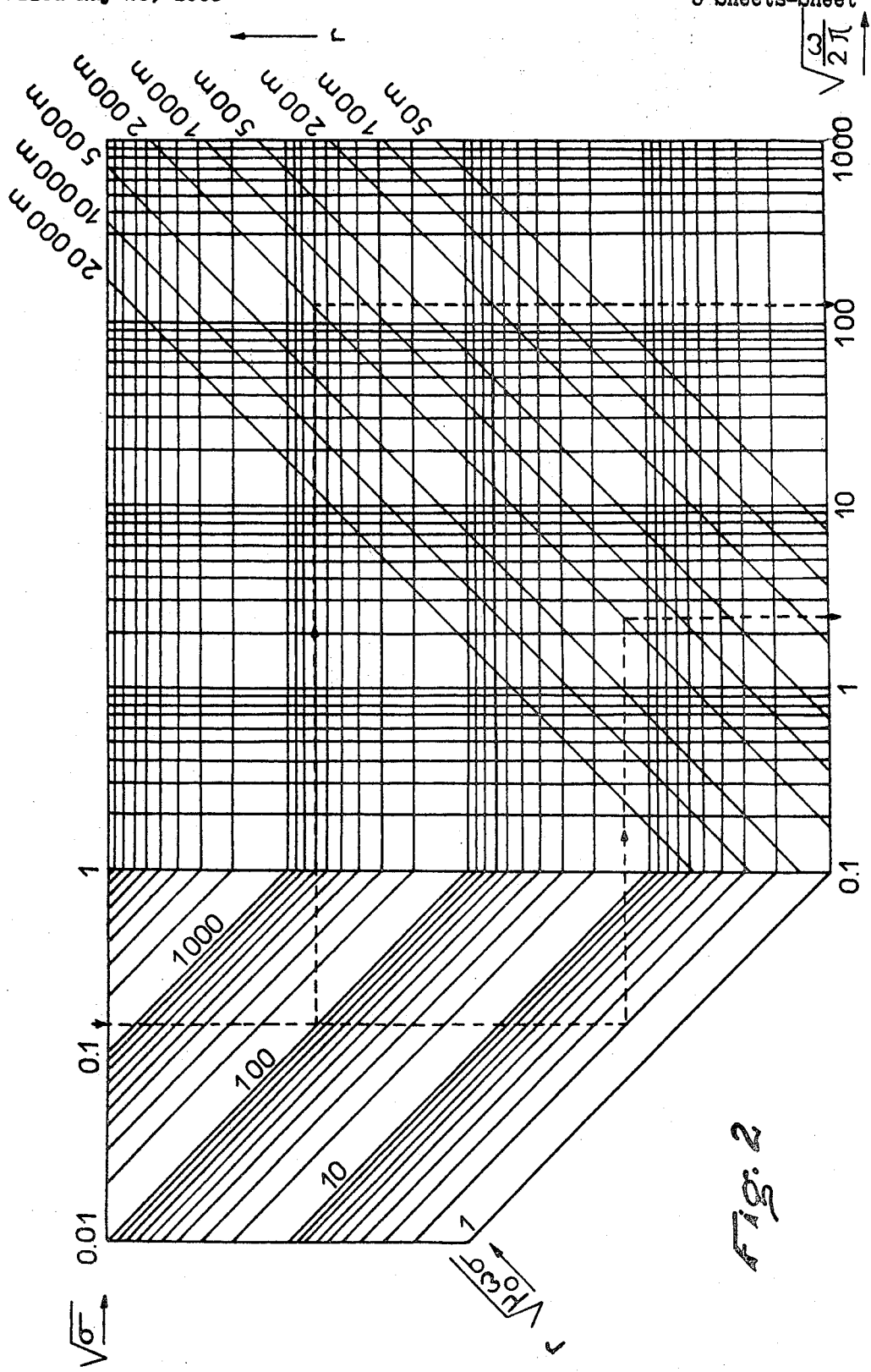

In the drawings:

FIG. 1 shows variations of the correction factor K involved in the method covered by this invention, as a function of $Hx/Hz$, FIG. 2 shows a nomogram, linking the values $$\sigma, r, r\sqrt{\mu_o w \sigma}$$

and $$\sqrt{\frac{w}{2\pi}}$$

Figure 3:
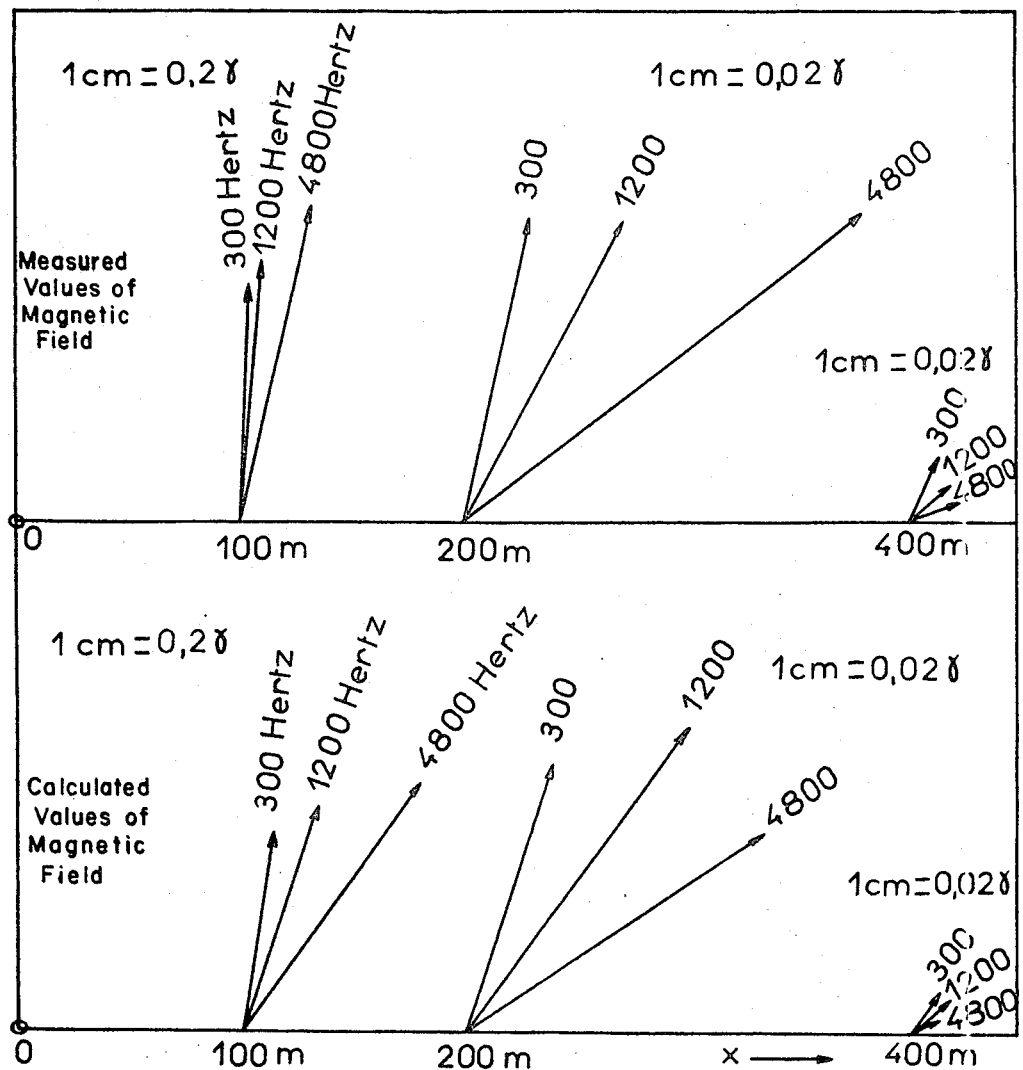
Figure 4:
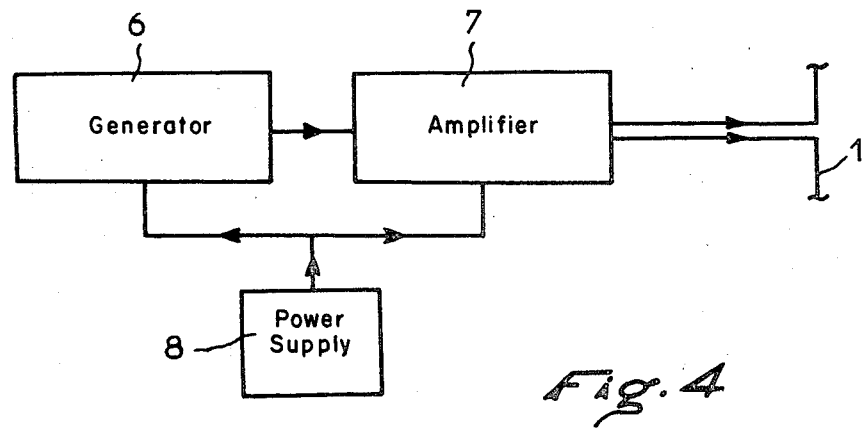
Figure 5:
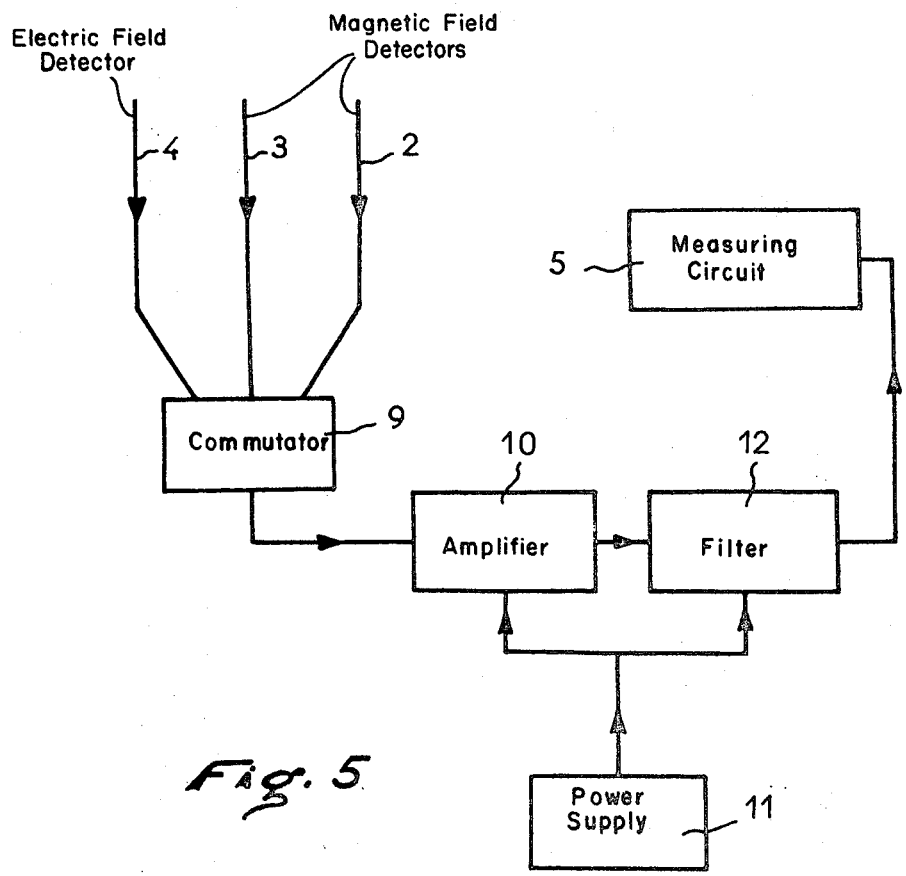

FIG. 3 shows the amplitude and inclination of the magnetic field at various distances whose values have been measured, in the upper portion of the drawing, or calculated, in the lower portion, FIG. 4 shows the electric block circuit diagram of the transmitter device, FIG. 5 shows the circuit diagram for the receiver device, and FIG. 6 shows the curves of a correction factor $K'$ and $$\sqrt{K'}$$

as a function of the values of $|Hx/Hz|$.

According to the invention we preferably use as source of electromagnetic radiation emission a magnetic dipole with a verticle axis consisting, for example, of N turns, with a unit surface S, placed on the surface of the soil and traversed by an alternating current $I \sin wt$.

The complete study of the field in the vicinity of a magnetic dipole, arranged on any conducting half-space, has not yet been concluded and no rigorous and complete mathematical solution has thus been found. We will therefore give a description of the phenomena based on simple considerations verified during the experiments conducted by the applicant. These considerations and verifications will then lead us to the method for measuring the conductivity of ground in great depth, which is the object of this invention.

In order to facilitate the description of the method involved in this invention, we will assume, initially, that we are dealing with a homogeneous subsoil.

Calculation and experimentation has shown that the simplifications of the calculations performed here enable us to come up with the following formulas which, with an accuracy of better than 1/100, give us the horizontal components of the electromagnetic field $Hx$ and $Ey$, provided the value of $|\gamma r|$ is greater than 12. The complex propagation constant is $$\sqrt{j\mu_o w \sigma}$$

$r$ being the distance from the measurement point to the dipole, $\mu_o$ being the magnetic permeability of the vacuum, $w$ being the angular frequency, and $\sigma$ being the conductivity of the environment.

We will therefore adopt the following values for $Ey$, $Hx$ and $Hz$:

$$Ey = \frac{6}{\gamma^2_r 2} Eo$$

$$Ax = \frac{6}{\gamma r} H_o$$

$$Hz = \frac{18}{\gamma^2_r 2} Ho$$

$Eo$ and $Ho$ are the standard values of the electric and magnetic fields, where, $$Eo = \frac{NSI}{4\pi r^2} jw\mu_o \text{ and } H_o = \frac{NSI}{4\pi r^3}$$

From these expressions we can deduce the following:

(a) That the ratio of the modules of the horizonal electrical field and the vertical magnetic field does not depend upon the conductivity of the subsoil: $|Ey/Ez|$ here being approximately equal to $\mu_o w r/3$;

(b) That the vertical magnetic field decreases at the rate of $1/r^5$ whereas the horizontal magnetic field decreases only after $1/r^4$;

(c) That the ratio of the modules of the horizontal electrical field and of the horizontal magnetic field depends only on the frequency and the conducttivity of the soil:

$$\left|\frac{Ey}{Hx}\right| = \sqrt{\frac{\mu_o w}{\sigma}}$$

By way of example, the preceding expressions enable us to calculate the numerical values given in the following table for the fields irradiated by a dipole with a magnetic moment equal to 5.000 a.t./m.² and resting on a homogeneous subsoil with a resistance of $50\Omega$ m.

| w/2π | r | | | |
|---|---|---|---|---|
| | 200 m. | 400 m. | 800 m. | 1,600 m. |
| 1 Hz.: | | | | |
| Ey | [1] 0.08 | [1] 0.02 | [2] 5 | [2] 1.2 |
| Hx, m γ | [3] | [3] | 0.02 | 0.011 |
| Hz, m γ | 63 | 8 | 1 | 0.125 |
| 100 Hz.: | | | | |
| Ey, mv./km | 7.7 | 1.75 | 0.28 | 0.02 |
| Hx, m γ | 9.5 | 3.9 | 1.05 | 0.135 |
| Hz, m γ | 67 | 0.3 | 1.27 | 0.054 |
| 10,000 Hz.: | | | | |
| Ey, mv./km | 80 | 4.6 | 0.29 | 0.018 |
| Hx, m γ | 54 | 3.15 | 0.18 | 0.012 |
| Hz, m γ | 17.5 | 0.56 | 0.017 | 0.00054 |

[1] Mv./km.
[2] μv./km.
[3] Very small.

where $1\gamma = \frac{1}{400}\pi$ a.t./m.

The values of $|\gamma r|$, which enable us to calculate the preceding values, are given in the table below:

| w/2π | r | | | |
|---|---|---|---|---|
| | 200 m. | 400 m. | 800 m. | 1,600 m. |
| 1 Hz | 0.08 | 0.16 | 0.32 | 0.64 |
| 100 Hz | 0.8 | 1.6 | 3.2 | 6.4 |
| 10,000 Hz | 8 | 16 | 32 | 64 |

It is obvious that, depending upon the measurements to be made, we use dipoles having an increased or reduced radiation. For example, we can multiply the fields by 100, using an emitter of 500.00 a.t./m.$^2$.

In the case where the distance $r$ from the measurement point to the dipole corresponds to values of $|\gamma r|$ greater than 12, the wave level containing $$\vec{Ey} \text{ and } (\vec{Hx} + \vec{Hz})$$

continues progressively to approach the horizontal level as we move further away from the emitting dipole, until the plane tangent to the surface of the wave at each point is practically fused with the horizontal level. We thus get a level "quasi-wave," approximately and locally, or an evanescent wave which penetrates into the subsoil and whose field values at a depth $z$ we know how to calculate as a function of the quantities $\gamma$, $\sigma$, $\mu_0$ and $w$.

If we use the letter E to refer to the place of emission of the dipole, if we use the letter R for the point where $|\gamma r|$ will be very much greater than 12, and if we use the letter P for a point situated in depth along the vertical from R, then the experiments and measurements performed by the applicant show that everything occurs as if the path of propagation of irradiated energy were to run according to the path ER in the space above and near the surface, after which the path RP undergoes an abrupt refraction. Considering the approximations performed, approximations which are current in all of the usual geophysical cases where the refraction index $\nu$ of the soil varies from several dozen to several thousand times the index $\nu_0$ of the air assumed to be equal to unity, we can say that we can apply the principle of Fermat, transposing it to our case here. We know that this principle states that the optical path followed by the radiation from one point to another is at a minimum after any number of reflections or refractions. We can thus write the following:

$$\nu_0(ER) + \nu(RP) \ll \nu(EP)$$

It is obvious that the linear path ER would have to be corrected by interposing a thickness of air at least on the order of magnitude of a fraction of the wave length in the most heavily refracting environment. However, the fruitful results obtained by the new method for the measurement of the resistance in depth certainly justify these approximations.

According to the invention, we can thus get through anything that might exist usually in the subsoil between the transmitter and the receiver; for each frequency used, we can make sure that the vertical magnetic field will be sufficiently weak so as to remain within the area of approximation of large values of $|\gamma r|$. If we now assume that we are dealing with a heterogeneous subsoil, then it suffices to transpose the classical theory of the penetration of a horizontal wave into the subsoil, applied for example in the magnetic-earth-current method, in order to perform plumbsounding for the measurement point, calculating the surface impedance by means of the measurements of the magnetic and electrical fields on the surface for each of the frequencies of the band considered.

For each frequency, the surface impedance gives us the apparent conductivity. We know that the surface impedance, that is to say, the ratio $Ey/Hx$, taken for a given frequency band, is in a ratio to the complete distribution of the constituents of the various types of ground traversed as a function of the depth of penetration which itself is a function of the frequency.

The stratified horizontal distribution constitutes the easiest case of application of this new method but it is evident that it can also be applied to any other configuration of the subsoil.

We thus take into account the geometric distributions of the resistances in the subsoil, in addition to the horizontal stratification, and we again use and transpose the principle of Fermat, of course taking into account the lateral variations in resistances. For example, where the subsoil consists of two resistance environments $\rho_1$, and $\rho_2$, separated by a vertical half-level, if we have the ratio $\rho_1/\rho_2 = 100$, the magnetic field on the surface is still disturbed by several percent on the side of the lowest resistance, at a horizontal distance of the vertical half-level equal to the penetration depth, at the frequency considered, of course, and in the level with the smallest resistance. Where the lateral variation between resistance and depth is less marked, the horizontal distance, up to which the lateral effect is manifested, becomes very much smaller than the penetration depth. In summary we can thus say that the "lateral precision" of the measurements very often is of the same order as the depth precision.

There may develop certain cases where because of the distance between the measurement point and the dipole and because of the rapid decrease of the irradiated field, we can no longer operate under the conditions indicated above. This in effect would force us to employ colossal emission powers.

We must thus have a condition where the value of $|\gamma r|$ is small so that the approximate expression of the ratio $Ey/Hx$ is no longer valid.

Now, if we compare the formulas giving us, on the one hand, the rigorous value of the electric or magnetic fields irradiated to the surface of the soil as a function of $|\gamma r|$, horizontal field and vertical field, and on the other hand the approximate value of these fields, we find that it is possible to write the following for each of the low values of $|\gamma r|$:

$$\frac{Ey \text{ approx.}}{Ey \text{ rigorous}} = \frac{E_0 \cdot K_1}{E_0 \cdot K_2} \text{ and } \frac{Hx \text{ approx.}}{Hx \text{ rigorous}} = \frac{H_0 \cdot K_3}{H_0 \cdot K_4}$$

where $K_1$, $K_2$, $K_3$ and $K_4$ are numerical constants which we can calculate for various values of $r_2$. If we set us $$K = \left(\frac{K_1 \cdot K_4}{K_2 \cdot K_3}\right)^2$$

we can write as follows:

$$\left(\frac{Ey}{Hx}\right)^2 \text{ approx.} = K\left(\frac{Ey}{Hx}\right)^2 \text{ rigorous}$$

All we have to do then is to introduce the rigorous values measured and altered by the coefficient K into the formula giving us the apparent resistance:

$$\rho = \frac{1}{\mu_0 w}\left(\frac{Ey}{Hx}\right)^2$$

instead of using the approximate values of the fields.

According to the invention we can thus determine the correction factor K for small values of $|\gamma r|$, that is to say, in practice, for the values $|\gamma r|<12$, as a function of the ratio $Hx/Hz$ rigorous, also known as a function of $|\gamma r|$, and directly accessible by measurement.

FIG. 1 shows the curves K and $\sqrt{K}$ as a function of $Hx/Hz$.

It is thus possible, with the help of the new method described in this invention, to measure the apparent resistance not only when we have large values of $|\gamma r|$, using the measurement of $Ey$ and $Hx$, but also when we have small values of $|\gamma r|$, this time using the measurement of $Hx$, $Hz$, and $Ey$, and there is no need for any disproportionate increase in the emission power of the dipole.

The value of $|\gamma r|$ is equal to $r\sqrt{\mu_0 w \sigma}$ and the order of magnitude of the conductivity $\sigma$ is of course given. According to the invention, we can then get ready to determine the distance R to the transmitter and the angular frequency $w$ so as to remain within the most favorable limits of $|\gamma r|$. For this purpose we have worked out a monogram shown in FIG. 2, giving us the distance to the transmitter $r$, the frequencies to be used $$F = \frac{w}{2\pi}$$

and the average useful subsoil conductivity $\sigma$. We must obviously make sure that, at this distance, the irradiated field can be measured with the instruments we use.

By way of example we might assume that we know the order of magnitude of $\sigma$. We introduce the value $\sqrt{\sigma}$ on the higher scale. We want to keep $|\gamma r|$ within the most favorable values, for example, between 2 and 100. It suffices to draw two horizontal lines from the points of intersection of the vertical of the abscissa $\sqrt{\sigma}$ with the curves $r\sqrt{\mu_0 w \sigma}=2$ and $r\sqrt{\mu_n w \sigma}=100$ and to extend them all the way to the straight line $r=2{,}000$ m., in order to get the frequency band concerned, given as a function of the abscissas of the points of intersection measured on the lower horizontal scale giving us $$\sqrt{\frac{w}{2\pi}}$$

If, at the distance of $r=2{,}000$ m., the field can still be measured, then we see that $$\sqrt{\frac{w}{2\pi}}$$

is between 2.5 and 125.

We can observe that in many cases the measurement point is located practically and very schematically at most at a distance from the transmitter that is something like 4 times the penetration depth.

Let us take a look at the diagrams in FIG. 3 showing the upper portion of the values measured for the amplitude and the inclination of the magnetic field irradiated by the magnetic dipole vertical to the surface of the soil at distances of 100, 200, and 400 m. from the magnetic dipole, for frequencies of 300, 1,200 and 4,800 cycles and in the lower portion of the values calculated. We will find that this justifies the accuracy of our earlier statements and that it demonstrates the effectiveness of the new method for determining the conductivity of ground in depth. The method was implemented with the help of a dipole with a magnetic moment equal to 5,000 a.t./m.$^2$ and transmitting on the 5–5,000 cycle band. The sensitivity of the electric detector was in excess of $\frac{1}{10}$ microvolt per meter whereas that of the magnetic detector was between $\frac{1}{100}$ and $\frac{1}{10{,}000}$ gamma.

The agreement between theory and experiment thus appears to be excellent if we take into account the approximations made in the drawing on the constitution of the subsoil at the place where the experiment was conducted. This agreement would have been absolute if we had been dealing with a perfectly homogeneous subsoil.

This example enables us to show:

(a) That the magnetic field irradiated by the dipole can be represented simply by the components $Ey$, $Hx$ and $Hz$ under the usual geophysical conditions;

(b) That the propagation of the fields according to the theory described above has been verified quantitatively, with the inclination of the magnetic field increasing along with the parameter $|\gamma r|$;

(c) That the electric field measurements conform to the calculated values;

(d) That the application of the correction factor K, in accordance with the following table, enables us to obtain corrected values for the apparent resistance which are perfectly satisfactory, in contrast to the rather raw values emerging only from the ratio $Ey/Hx$;

(e) Finally, that the value of $$\frac{1}{w} \cdot \frac{Ey}{Hz}$$

is constant for a given distance from the measurement point to the transmitter; the difference between this value and the average value here facilitating a correction of any possible measurement errors.

| $w$/in Hertz $2\pi$ | $\frac{Ey}{Hz} \cdot \frac{1}{w}$ | K | $\rho$ measured in $\Omega$ m. | $\rho$ corrected in $\Omega$ m. |
|---|---|---|---|---|
| 4,800 | 0.79·10⁻⁴ | 0.32 | 410 | 130 |
| 2,400 | 0.60·10⁻⁴ | 0.15 | 516 | 77 |
| 1,600 | 0.63·10⁻⁴ | 0.1 | 610 | 61 |
| 1,200 | 1.07·10⁻⁴ | 0.16 | 715 | 113 |
| 800 | 0.80·10⁻⁴ | 0.095 | 590 | 56 |
| 500 | 0.79·10⁻⁴ | 0.06 | 800 | 48 |
| 300 | 0.90·10⁻⁴ | 0.04 | 980 | 39 |
| 185 | 1.07·10⁻⁴ | 0.03 | 1,220 | 37 |

According to the invention, the apparatus that enables us to use the above-mentioned method essentially consists of a magnetic dipole which is shown in FIG. 4 at point 1 and which consists of a circular and horizontal loop insulated against the ground, as well as magnetic detectors 2 and 3, in FIG. 5, an electric detector 4, and a measurement apparatus 5.

However, in order that we may use the apparatus very easily during a prospecting mission in the field, the entire unit must be as practical, simple and light-weight as possible while still giving us great efficiency.

The emission loop is thus so selected that, for the given power supply, we get a maximum magnetic field radiated at a distance $r$ from the dipole.

Now, we know that the field radiated at a distance $r$ by a magnetic dipole consisting of N turns with unit surface S, traversed by a current $I \sin wt$. can be expressed as a function of the standard field $Ho$ of the dipole where $$Ho = \frac{NSI}{4\pi r^3}$$

If we refer to the length of the wire used in the loop by the letter $l$, if we use $s$ for its cross section, $\rho$ for the resistance of the metal, D for the diameter of the loop, and P for the power supply, we can see that:

$$N = \frac{l}{\pi D}, \quad S = \frac{\pi D^2}{4} \text{ and } I = \sqrt{\frac{Ps}{\rho l}}$$

from which we deduce:

$$Ho \sim D\sqrt{P} \sqrt{\frac{ls}{\rho}}$$

Thus, the ratio of power received, proportional to $H^2$, with respect to the power emitted, for a given distance between the transmitter and the receiver, behaves as:

$$\frac{H^2}{P} \sim D^2 \frac{ls}{\rho}$$

The radiated field depends only on the diameter of the loop and on the weight of the metal used. According to the invention, we preferably select loops with a single turn, where the diameter D is as big as possible.

9

If we use aluminum instead of copper, we can make the entire unit much lighter. Copper might however, be retained because of its mechanical qualities.

By way of example, we can take a value of $D=100$ m. for the diameter and the weight of the copper can be 50 kg., including the weight of the insulation. We thus have a loop whose wire length is 374 m., while the diameter of the wire is 4 mm. Under these conditions, the resistance

10

If we look at the following table, which gives us the value for the self inductance of each loop with diameter D as a function of the frequency series selected where the empty boxes, shown on the right in the table, correspond to a $Lw$ value smaller than the pure resistance for the loop, we find that it is always possible to find a loop, regardless of the prospecting situation considered, where the $Lw$ remains small in a given frequency range.

| | F | | | | | | | | | | |
|---|---|---|---|---|---|---|---|---|---|---|---|
| D | 20,000 Hz. | 10,000 Hz. | 5,000 Hz. | 2,500 Hz. | 1,200 Hz. | 500 Hz. | 230 Hz. | 120 Hz. | 80 Hz. | 50 Hz. | 30 Hz. |
| 11 m. Lw, Ω | 8.25 | 4.12 | 2.06 | 1.03 | 0.495 | 0.206 | 0.095 | | | | |
| 36 m. Lw, Ω | | 14.3 | 7.15 | 3.58 | 1.72 | 0.715 | 0.33 | | | | |
| 120 m. Lw, Ω | | | | 12.2 | 5.87 | 2.44 | 1.12 | 0.587 | | | |
| 300 m. Lw, Ω | | | | | 15.8 | 6.55 | 3.02 | 1.58 | 1.05 | 0.655 | |
| 600 m. Lw, Ω | | | | | | 13.5 | 6.23 | 3.26 | 2.17 | 1.35 | 0.81 | of the loop is about $R=0.5\Omega$, and the diameter of the wire is sufficient to enable the intensity to reach about 25 a., without any excessive heating. To supply the loop, we thus need a power of $P=RI^2$, in other words, 300 watts.

In practice we will thus approach theoretical as well as actually discovered values if we select, from among the possibilities offered by the builders, a generator with light weight and easily handling, great reliabiilty and a band corresponding to the frequency band described earlier, going continuously all the way up to 30,000 cycles and more. In the example considered, we might select a 300-watt generator putting out 21 effective a. and 14 effective v.; this generator might be supplied by a gasoline-powered electric power generating group of 1.5 k.v.a., 110 v. and 50 c.p.s. Calculation and experimentation show us that loops with small diameters are more suitable for the surface investigation of land and that loops with a large diameter are better for investigation in depth. According to the invention we have a sufficient number of loops with the same resistance but with different diameters so that we can meet the various requirements of prospecting.

The transmitter device consisting of generator 6 and amplifier 7 is thus designed so that it can be connected to any one of the transmission loops selected. This device, powered by electric power generating group 8, enables us to send a high-intensity current into any one of the low-impedance loops selected, with the frequency continuously ranging to more than 30,000 c.p.s.

For this purpose, generator 6 is an adjustable-frequency voltage generator, and the frequency can vary continuously. Its output voltage is applied to continuous-current power amplifier 7 whose output has a low impedance.

Experience has shown that it is sufficient to use a series of frequencies of determined value.

According to one particular arrangement of this invention, we select a series of values distributed approximately in octaves, so that we have the following series, for example: 0.5, 1, 2, 4, 8, 15, 30, 50, 80, 120, 230, 500, 1,200, 2,500, 5,000, 10,000, 20,000 c.p.s., a series which we can extend upward or downward.

These value are not rigorously placed from octave to octave so as to avoid some of the too noisy regions of the spectrum. The frequency of 50 c.p.s. can be used to measure the noise if we are in a region where industrial noise is high.

In order to have a maximum field radiated for reception, for the frequency series considered, we benefit from the fact that we have a series of loops from which we can select the one best suited for our particular prospecting mission. Furthermore, in order to reduce the number of loops, we can make sure that all of the frequency bands, for which the product $Lw$ calculated for the various loops has a low value, will cover all of the band ranging from direct current all the way to 30,000 c.p.s. and more.

In the example considered here, we selected a series of loops whose diameters are: 11, 36, 120, 300 and 600 m.

This distribution thus enables us to avoid the use of a capacitance in series with the loop used. This would have been necessary in order to tune the circuit every time the value of the self inductance, for the frequency considered, would have involved a value of $Lw$ exceeding the order of magnitude of the pure resistance. This suppression of a tuning capacitance is all the more worthwhile here, as we can reduce the weight of the apparatus, eliminate the risks due to the overvoltages produced, and avoid an operation required for the adjustment of the tuning.

On the other hand, the yield of the transmitter and the sensitivity of the magnetic detectors increase with the frequency, at least within a certain range. We can see that this new type of transmitter always enables us to obtain an excellent yield while still being economical and practical, both because of the simplicity of the apparatus and because of its relatively easy handling.

We can further improve the handling of the apparatus by connecting the output of each detector, of which we only have three, to a commutator switch 9, for greater clarity as shown in FIG. 2. These commutator switches usually are connected to the input of a variable-gain amplifier 10, preferably supplied by dry-cell batteries or rechargable batteries 11.

Amplifier 10, which is of the DC type, has a high input impedance R which is greater than $10^6\Omega$ in the example considered and a practically flat pass band from DC all the way to more than 30,000 c.p.s. Its gain is adjustable from 1–5,000. It is connected to measurement apparatus 5 by means of a filter 12 which is pre-adjusted to commutable frequencies. Filter 12 involves a series of active narrow-band pass band filters, tuned in accordance with the series of frequencies considered. An example of this was given earlier. The cutoff slope of these filters is on the order of 30 db per octave.

To measure the vertical component Hz of the electromagnetic field, for example, it suffices to put the button of commutator 9 in the position corresponding to detector Hz and to commutate filter 12 to the emission frequency. We thus avoid any regulation and adjustment and we consequently can eliminate any possible registration error. The frequency is selected immediately by a simple commutator push button, for example.

The various devices used here, the voltage generator, the DC power amplifier, the variable gain amplifier, the commutable filter, the measurement apparatus, are known by themselves and will not be described here. However, according to the invention, commutable filter 12 is an active filter having a certain gain, 10 in the example selected, and it consists of a grid involving capacitances, resistances anrd operational amplifiers, in combination with a commutation member, thus enabling us to obtain an output frequency corresponding to the selection made by the commutation member. On the other hand, according to the invention, we use magnetic detectors whose sensitivity would be acceptable in the widest frequency band possible by tuning the detector, in the example considered, to a figure of 1,200 c.p.s. The sensitivity remains at a level which would not be too high so as to avoid the manifestation of a rather considerable background noise due to the electromagnetic agitation of natural and industrial origin. By the same token, we can avoid the need for using several detectors in order to measure a single compoment, something which is particularly helpful since, in a certain frequency range, the sensitivity increases with the frequency and since, on the other hand, the H$x$ field measured increases when the frequency decreasse.

Measurement apparatus 5 may be a simple alternating millivoltmeter, of the current type, whose measurement range extends, for example, from 1 to 10$^6$ Hz. or, in the case of the very lowest frequencies all the way up to the hertz: In other words, a cathodeosilloscope or a graphic registration instrument.

It is not essential for the apparatus to be rigorously regulated in terms of absolute value since the method is based on the relationships of fields of all which are measured on the basis of one and the same unit of amplification. This means that poor power supply or any maladjustment or irregularity in the measurement cannot cause an error in the results obtained.

Finally, this gives up a cheap, simple, light-weight and easily handled apparatus which is both practical and efficient and which is especially suited for prospecting because it does not require any rigorous regulation or adjustment operation between the frequencies of the transmitter and the receiver.

In order to avoid any saturation of the apparatuses, we can put a filter into the receiver. This filter is intended to cut the high frequencies of external origin, generally radiophonic, and we can put in another filter intended to eliminate the low industrial frequencies of 50 or 60 c.p.s.

It is clear that many variations could be introduced in this apparatus. For example, circuits could be provided to achieve the automatic sequential commutation of the detectors and the frequencies. The frequency commutations would here be performed in synchronization with the changes in the transmitter frequency. We could multiply the number of frequencies used and even at the very limit we could have a continuous variation of the transmission and reception frequencies.

Similarly, the measurement apparatus 5 can include all of the suitable calculation devices so as to give us automatically the results we want through the processing of the values for the various components of the electromagnetic field. These results can be given in any desired form.

On the other hand, we could also do the following:
Incline the axis of the dipole;
Complete the measurements made with a measurement of the horizontal longitudinal electric component and of the transversal horizontal magnetic component in order to characterize the lateral variations in conductivity;
Measure the relative phase shifts of all of the components of the electromagnetic field in order to improve measurement precision and in order to eliminate any possible doubtful or undetermined points;
Replace the magnetic dipole with an electric dipole;
Place the transmititng dipole or the reception devices, on land or on the sea, either on the surface or at some height or in the depth, into a drill hole, a tunnel, or in water, and arrange them in such a way that we can benefit from the method explained above;
Supply the dipole with nonsinusoidal periodic current or with a nonperiodic current whose reception devices will guarantee the harmonic Fourier analysis.

However, among all of the variations, the simplest one still consists in suppressing the electric detector drawn schematically by line 4 in FIG. 5 and to use for the determination of the conductivity only the calculation of the ratio $|Hx/Hz|$ of the components of the magnetic field after introduction of a correction factor K' analogous to the correction factor K in FIG. 1.

The curves of the correction factor K' and of $\sqrt{K'}$ as a function of the values $|Hx/Hz|$ introduced into the expression giving the apparent resistance as a function of the components of the magnetic field H$x$ and H$z$ have been plotted in FIG. 6.

If we arrange our equipment in the schematic case of a subsoil consisting of an unlimited homogeneous half-space with conducivity $\sigma$, then the ratio of the approximate values of the magnetic fields, obtained for large values of $|\gamma r|$, can be written by using the formulas given above for the calculation of the approximate values of E$y$, H$x$ and H$z$ as a function of E$o$, H$o$, and $\gamma r$ for large values of $|\gamma r|$:

$$\left|\frac{Hx}{Hz}\right| = \frac{6Ho}{\gamma r} \cdot \frac{\gamma^2 r^2}{18 Ho} \text{ or } \left|\frac{\gamma r}{3}\right|, \text{ i.e., } \frac{r}{3}\sqrt{\mu_o w \sigma}.$$

From this we deduce the expression for the resistance of the subsoil:

$$\rho = \frac{1}{\sigma} = \frac{r^2 w \mu_o}{9\left(\frac{Hx}{Hz}\right)^2}$$

We have discovered that this relation is verified with an excellent approximation for large values of $|\gamma r|$ and that it applies equally to the case of a subsoil involving a variable distribution of resistances as a function of the depth, considering the apparent resistance $\rho$ defined for each frequency.

It thus suffices to measure the values of H$z$ and H$x$ for different frequencies and to find the distance $r$ from the transmitter to the receiver in order to do the plumb-sounding of the measurement point.

If, on the other hand, we operate under distance, frequency, and resistance conditions where the parameter $|\gamma r|$ becomes too small to remain within the valid area of approximation obtained for large values of $|\gamma r|$, that is to say, in practice, for values of $|\gamma r|$ less than 12, in other words, conditions which often are the most favorable, then we introduce the correction factor K'.

The factor K' is calculated numerically as a function of $|\gamma r|$ or of $|Hx/Hz|$ on the basis of calculated, approximate, and rigorous expressions in terms of $\gamma r$ of the fields H$x$ and H$z$ of the magnetic dipole with a vertical axis, placed on a homogeneous conducting half-space, according to the formula:

$$K' = \left(\frac{Hx}{Hz}\right)^2 \text{rigorous} \cdot \left(\frac{Hx}{Hz}\right)^2 \text{approx.}$$

The general validity of using the factor thus calculated is justified in practice not only by experiments but also by the considerations mentioned earlier with respect to the path created by the radiation by virtue of the high values of the refraction index of the subsoil, compared to the air.

By way of example, the table below gives the results obtained as a result of the application of the method which is the object of this particular variant, in the course of a sounding operation performed near Gipy in Nievre, when the distance $r$ was 850 m.

| Frequency in Hertz | $\left\|\frac{Hx}{Hz}\right\|$ | K' | $\rho$ in ohm-meter |
|---|---|---|---|
| 8 | 0.097 | 0.20 | 111 |
| 15 | 0.25 | 0.41 | 65 |
| 30 | 0.585 | 0.585 | 33.9 |
| 80 | 1.15 | 0.59 | 22.9 |
| 120 | 1.36 | 0.60 | 24.4 |
| 230 | 1.76 | 0.65 | 31.1 |
| 500 | 2.44 | 0.82 | 43.5 |
| 1,200 | 4.82 | 1.00 | 32.6 |

The values for the apparent resistance thus obtained for the frequencies considered here are identical, perhaps with some tiny errors inherent in the experiment, but they are identical to the results furnished by the processing of the measurements of H$x$, H$z$ and E$y$. These results were obtained as in the case mentioned above with the help of a dipole with a magnetic moment equal to 200,000 a.t./m.$^2$, with the sensitivity of the magnetic detectors being between $\frac{1}{100}$ and $\frac{1}{10,000}$ gamma.

Since this involves the determination of the conductivity of earth for values of $|\gamma r|$ greater or smaller than 12, we can see that all we need would be two measurements of the field instead of three, in the method described above, in order to get the conductivity. On the other hand, we can say that the measurement apparatuses are highly simplified and the elimination of the measurement of E$y$ enables us to suppress a couple of electrodes and it is no longer necessary to calibrate the magnetic detectors in terms of absolute values. We can thus see the importance of this method which no longer requires us to know the parameter $r$, whose value is normally furnished during a topographic survey. Under certain circumstances, where a relative determination of the resistances suffices, it is clear that the knowledge of the distance $r$ becomes just about useless. This would be the case, for instance, when we do our prospecting in the ocean, where the conductivity of ocean water representing the first layer of earth, is known.

What is claimed is:

1. A method for determining the resistance of the earth by means of electromagnetic radiation, comprising:
   (a) establishing an artificial electromagnetic field at the place where the resistance of the earth is to be measured using a variable frequency generator and a magnetic dipole placed above said measuring place having a vertical axis,
   (b) measuring the radial component H$x$, the vertical component H$z$, and the transverse component E$y$ of said artifical electromagnetic field, and
   (c) determining the resistance of the earth $\rho$ from the following expressions:

$$Ey = \frac{6}{\gamma^2 r^2} Eo \quad Hx = \frac{6}{\gamma r} Ho \quad Hz = \frac{18}{\gamma^2 r^2} Ho$$

where E$o$ and H$o$ are the standard values for the electrical and magnetic fields produced by the dipole in a vacuum, respectively, having the following values:

$$Eo = \frac{NSI}{4\pi r^2} jw\mu_0 \quad Ho = \frac{NSI}{4\pi r^3}$$

where N is the number of turns of the coil, S is the unit surface, I is the current flowing in the coils, $r$ is the distance to the electromagnetic source, and $\rho$ is the complex propagation constant $\sqrt{(j\mu_0 w)/\rho,\mu_0}$ being the magnetic permeability of the vacuum, $w$ being the angular frequency, and $\rho$ being the resistance of the earth.

2. A method as defined in claim 1 wherein the field measurements are made at a distance $r$ from the magnetic dipole with a vertical axis and for each frequency the value of $|\gamma r|$ is greater than 12, $\gamma$ being the propagation constant, and the apparent resistance of the earth $\rho$ is given by the measurement of the ratio of the components E$y$ and H$x$ and the application of the formula:

$$\rho = \frac{1}{\mu_0 w} \left(\frac{Ey}{Hx}\right)^2$$

3. A method as defined in claim 2 wherein the values of $|\gamma r|$ are smaller than 12 and the resistance is obtained by the application of the formula:

$$\rho = \frac{K}{\mu_0 w} \left(\frac{Ey}{Hx}\right)^2$$

where the correction factor $$K = \left(\frac{Ey}{Hx}\right)^2_{\text{approx.}} \cdot \left(\frac{Hx}{Ey}\right)^2_{\text{rigorous}}$$

4. A method as defined in claim 1 wherein the frequencies used range from DC to more than 30,000 c.p.s.

5. A method as defined in claim 1 wherein, for each order of average magnitude of the conductivity of land to be prospected, a nomogram is used giving between the two limiting values of $r\sqrt{\mu_0 w \sigma}$, the frequency spread that will be best for measurements for a given distance between the transmitter and the receiver, the limits of $r\sqrt{\mu_0 w \sigma}$ being selected to meet the particular conditions encountered when prospecting.

6. A method as defined in claim 1 wherein the dipole or the reception devices may be placed either on the surface of the earth or at some height above it or depth below it, on land or on the sea.

7. A method as defined in claim 1 wherein the field measurements are made at a distance $r$ from the magnetic dipole with a vertical axis and for each frequency the value of $|\gamma r|$ is greater than 12, $\gamma$ being the propagation constant, and the apparent resistance of the earth $\rho$ is given the measurement of the ratio of the components of the magnetic field $|Hx/Hx|$ measured with magnetic detectors, and the application of the formula:

$$\rho = \frac{r^2 w \mu_0}{9 \left(\frac{Hx}{Hz}\right)^2}$$

where $w$ is the angular frequency and $\mu_0$ is the magnetic permeability of the vacuum.

8. A method as defined in claim 7 wherein the values of $|\gamma r|$ are smaller than 12, and the resistance is obtained by application of the formula:

$$\rho = K' \frac{r^2 w \mu_0}{9 \left(\frac{Hx}{Hz}\right)^2}$$

where the correction factor $$K' = \left(\frac{Hx}{Hz}\right)^2_{\text{rigorous}} \cdot \left(\frac{Hz}{Hx}\right)^2_{\text{approx.}}$$

9. An apparatus for determining the resistance of the earth by measuring the components of an artifically produced electromagnetic field comprising: a variable frequency current generator and a magnetic dipole with a vertical axis for producing said electromagnetic field, and a receiver comprising two magnetic detectors for detecting the magnetic components of said artificial electromagnetic field, an electric detector for detecting the electric components of said artificial electromagnetic field, a commutator with three terminals each connected to one output of said detectors for selecting one of the outputs of said detector for measurement, an amplifier and commutable, pre-regulated frequency filter assembly connected to the output of the commutator in order to filter and amplify the outputs of said detectors as selected by said commutator, a battery for supplying the amplifier and filter assembly, and a measurement apparatus for measuring the voltages transmitted by said filter assembly, whereby said measured voltages are indicative of the magnitudes of the electric and magnetic components of said artificial electromagnetic field and may be used to calculate the resistance of the earth from the following expressions:

$$Ey = \frac{9}{\gamma^2 r^2} Eo \quad Hx = \frac{6}{\gamma r} Ho \quad Hz = \frac{18}{\gamma^2 r^2} Ho$$

where E$o$ and H$o$ are the standard values for the electrical and magnetic fields produced by the dipole in a vacuum, respectively, having the following values:

$$Eo = \frac{NSI}{4\pi r^2} jw\mu_0 \quad Ho = \frac{NSI}{4\pi r^3}$$

where N is the number of turns of the coil, S is the unit surface, I is the current flowing in the coils, $r$ is the distance to the electromagnetic source, and $\gamma$ is the complex propagation constant $\sqrt{(j\mu_0 w/\rho}$, $\mu_0$ being the magnetic permeability of the vacuum, $w$ being the angular frequency, and $\rho$ being the resistance of the earth.

10. An apparatus as defined in claim 9 wherein said filter assembly is variable as to frequencies passed and may be adjusted to correspond to frequency values approximately distributed in terms of octaves, thus avoiding certain regions of the spectrum which are particularly noisy.

11. An apparatus as defined in claim 9 wherein the magnetic dipole with the vertical axis consists of an insulated loop resting on the ground, the loop being selected from among a series of loops with a single turn having the same resistance and different diameters, the values of the diameters being arranged like the frequency bands of the apparatus, for which the product $Lw$, calculated for each of the groups, has a low value, and the loop covers the entire band ranging from D.C. to 30,000 c.p.s. and more.

References Cited

UNITED STATES PATENTS

| | | | |
|---|---|---|---|
| 2,677,801 | 5/1954 | Cagniard | 324—8X |
| 3,422,345 | 1/1969 | Musé | 324—8 |

GERARD R. STRECKER, Primary Examiner

UNITED STATES PATENT OFFICE
CERTIFICATE OF CORRECTION

Patent No. 3,548,299          Dated December 15, 1970

Inventor(s) Jean DUROUX, Pierre R. Griveau and Michel Zahaczewsk

It is certified that error appears in the above-identified patent and that said Letters Patent are hereby corrected as shown below:

Column 3, line 5 - "immission" should be --emission-- line 38 - "Hx/Hz" should be -- $\frac{Hx}{Hz}$ -- line 47 - "K" omitted from formula line 53 - "K" should be --K'--

Column 4, line 45 - "$H_o$" should be --Ho-- line 53 - "$H_o$ should be --Ho-- line 58 - "Ez" should be --Hz-- line 65 - "conducttivity" should be --conductivity--

Column 6, line 58 - " $\frac{E_o}{E_0}$ " should be -- $\frac{E_o}{E_o}$ --

Column 7, line 20 - "monogram" should be --nomogram-- line 35 - $r \sqrt{\mu_n} \frac{w}{\sigma} = 100$ should be $r \sqrt{\mu_o} \frac{w}{\sigma} = 100$ Column 8, line 25 - w/in Hertz $2\pi$ should be $\frac{w}{2\pi}$ in Hertz Column 10, line 70 - "anrd" should be --and--

Column 11, line 8 - "compoment" should be --component-- lines 11-12 - "decreasse" should be --decreases-- line 24 - --apparatus-- omitted after "measurement"

UNITED STATES PATENT OFFICE
CERTIFICATE OF CORRECTION

Patent No. 3,548,299                    Dated December 15, 1970

Inventor(s) Jean DUROUX, Pierre R. Griveau and Michel Zahaczew

It is certified that error appears in the above-identified patent and that said Letters Patent are hereby corrected as shown below:

Column 11, line 64 - "transmititing" should be --transmitting-- line 72 - "all of the" should be --all of these--

Column 12, lines 18-19 - vertical line " | " omitted after equals sign line 50 - second part of formula should be $\left(\dfrac{Hz}{Hx}\right)^2$ Column 13, lines 5-6 - "be-in" should be --being-- line 49 - "$\rho$" should be -- $\gamma$ -- line 50 - $\sqrt{j\mu_0\omega)/\rho\mu_0}$ should be $\sqrt{(j\mu_0\omega)/\rho}\,\mu_0$ Column 14, line 18 - "given the" should be --given by the-- line 19 - $\dfrac{Hx}{Hx}$ should be $\dfrac{Hx}{Hz}$ line 63 - Ey=9 should be Ey=6 line 73 - $\sqrt{(j\mu_0\omega/\rho}$ should be $\sqrt{(j\mu_0\omega)/\rho}$ (second part of parenthesis ")" omitted)

Signed and sealed this 3rd day of August 1971.

(SEAL)
Attest:

EDWARD M. FLETCHER, JR.
Attesting Officer

WILLIAM E. SCHUYLER, JR.
Commissioner of Patents